(No Model.)    H. A. J. RIECKERT.    11 Sheets—Sheet 1.
AIR SHIP.

No. 399,783.    Patented Mar. 19, 1889.

(No Model.) H. A. J. RIECKERT. 11 Sheets—Sheet 2.
AIR SHIP.

No. 399,783. Patented Mar. 19, 1889.

WITNESSES:
W. R. Davis
C. Sedgwick

INVENTOR:
H. A. J. Rieckert
BY Munn & Co.
ATTORNEYS.

(No Model.) 11 Sheets—Sheet 4.

H. A. J. RIECKERT.
AIR SHIP.

No. 399,783. Patented Mar. 19, 1889.

WITNESSES:
W. R. Davis
C. Sedgwick

INVENTOR,
H. A. J. Rieckert
BY
Munn & Co.
ATTORNEYS

N. PETERS, Photo-Lithographer, Washington, D. C.

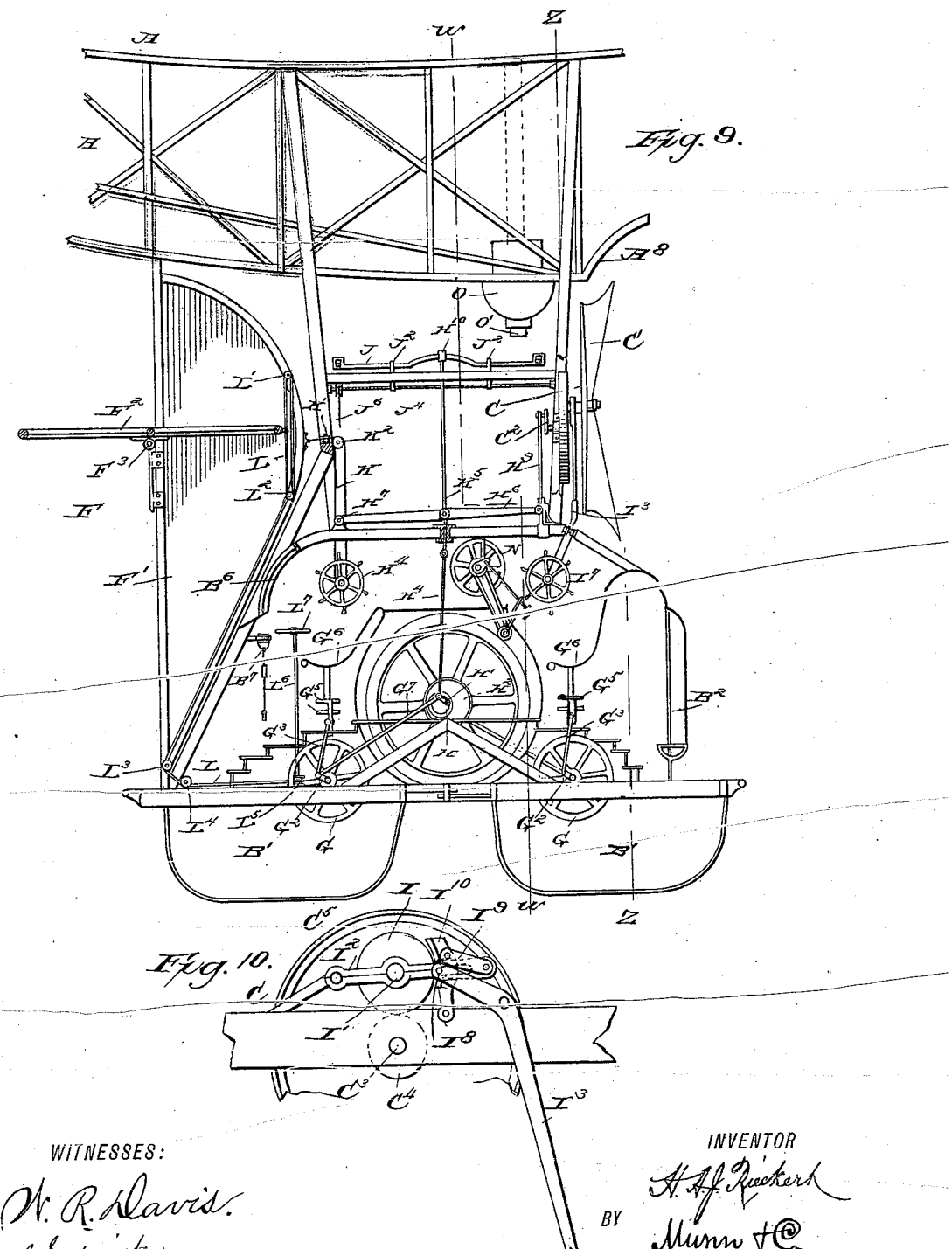

(No Model.) 11 Sheets—Sheet 6.
H. A. J. RIECKERT.
AIR SHIP.
No. 399,783. Patented Mar. 19, 1889.
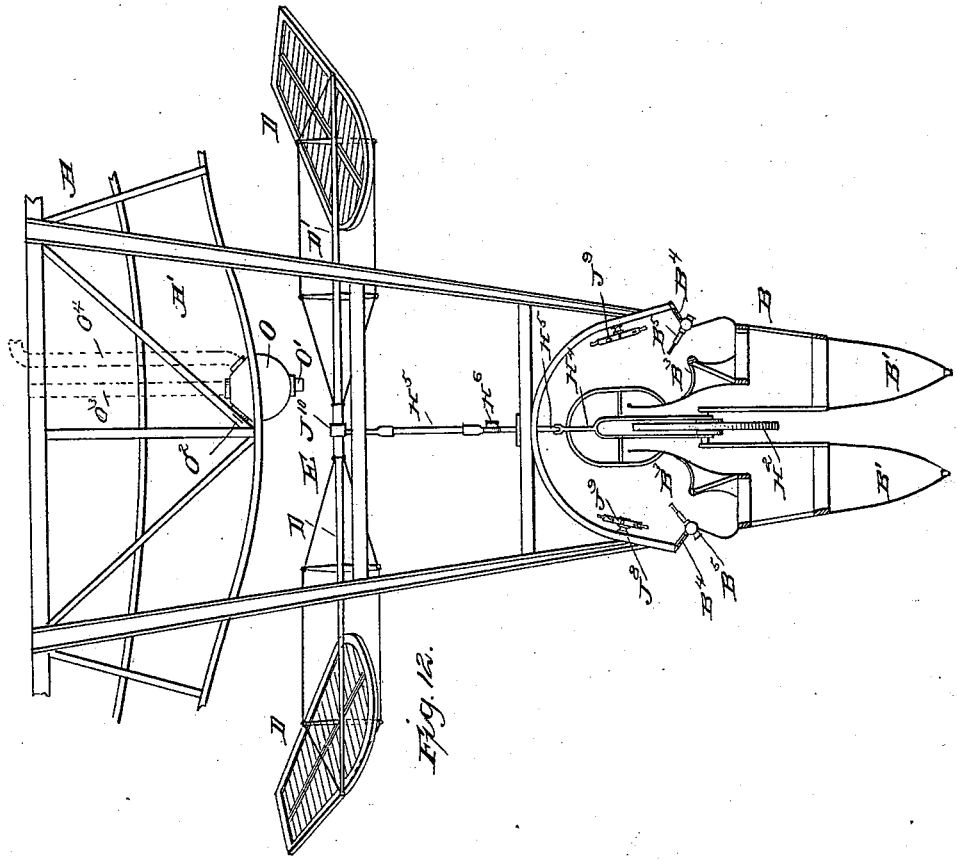
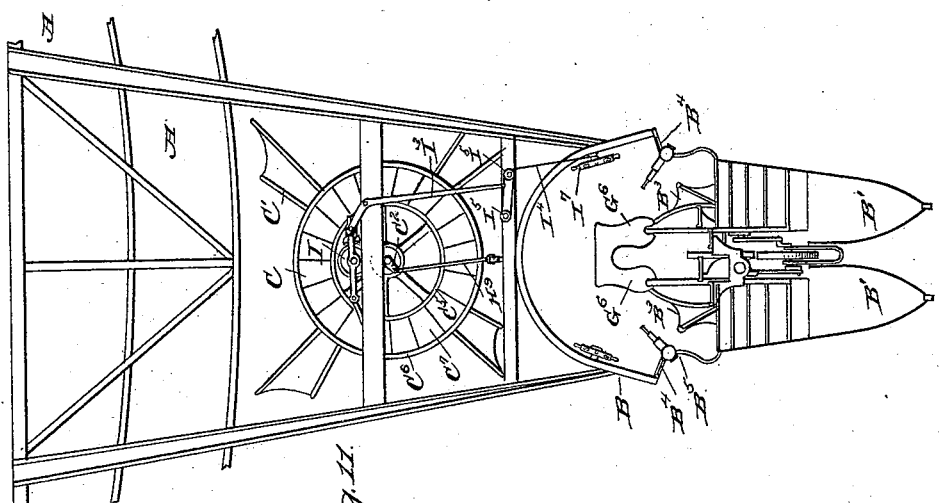
WITNESSES:
W. R. Davis.
C. Sedgwick.
INVENTOR,
H. A. J. Rieckert
BY Munn & Co.
ATTORNEY.

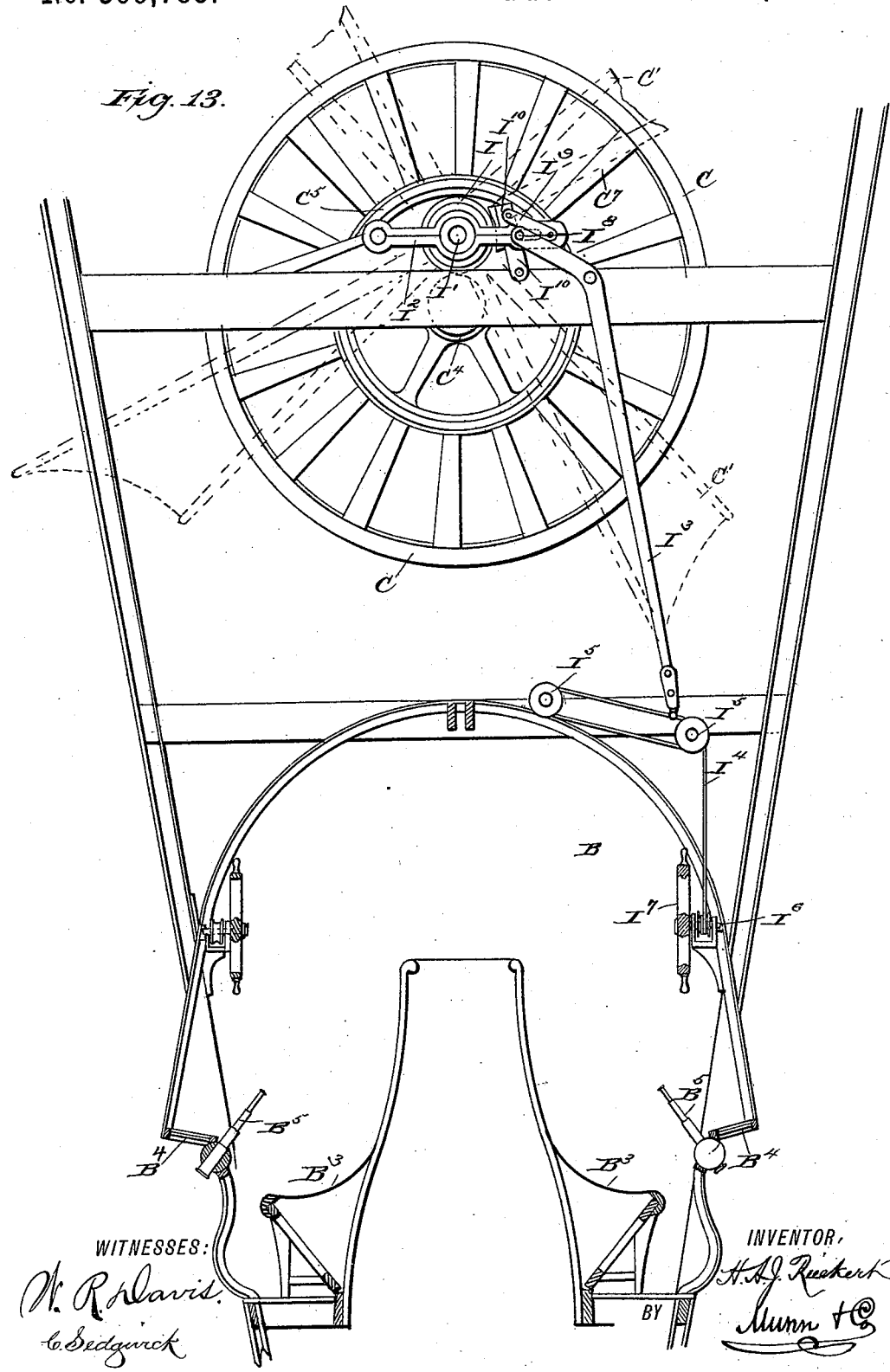

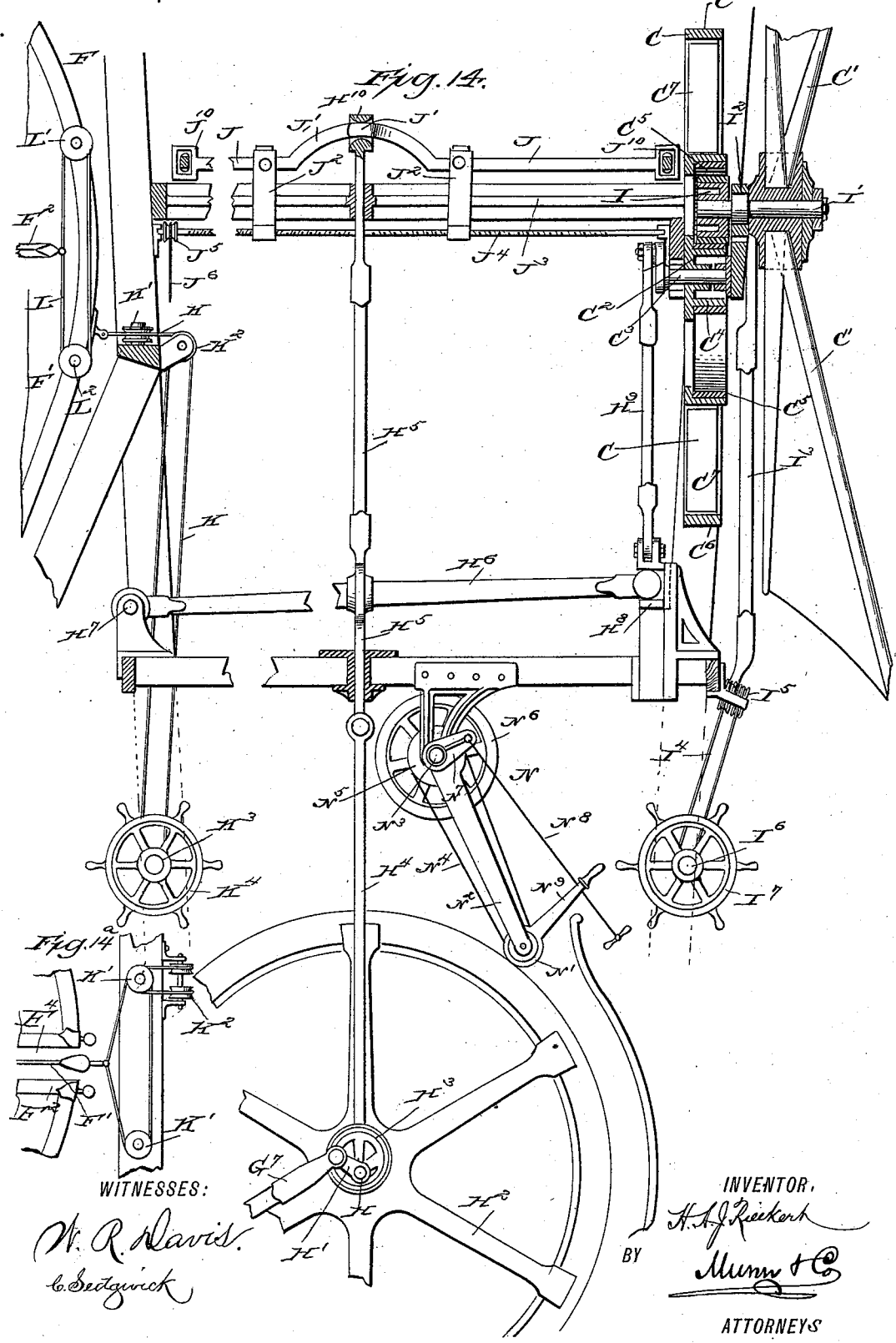

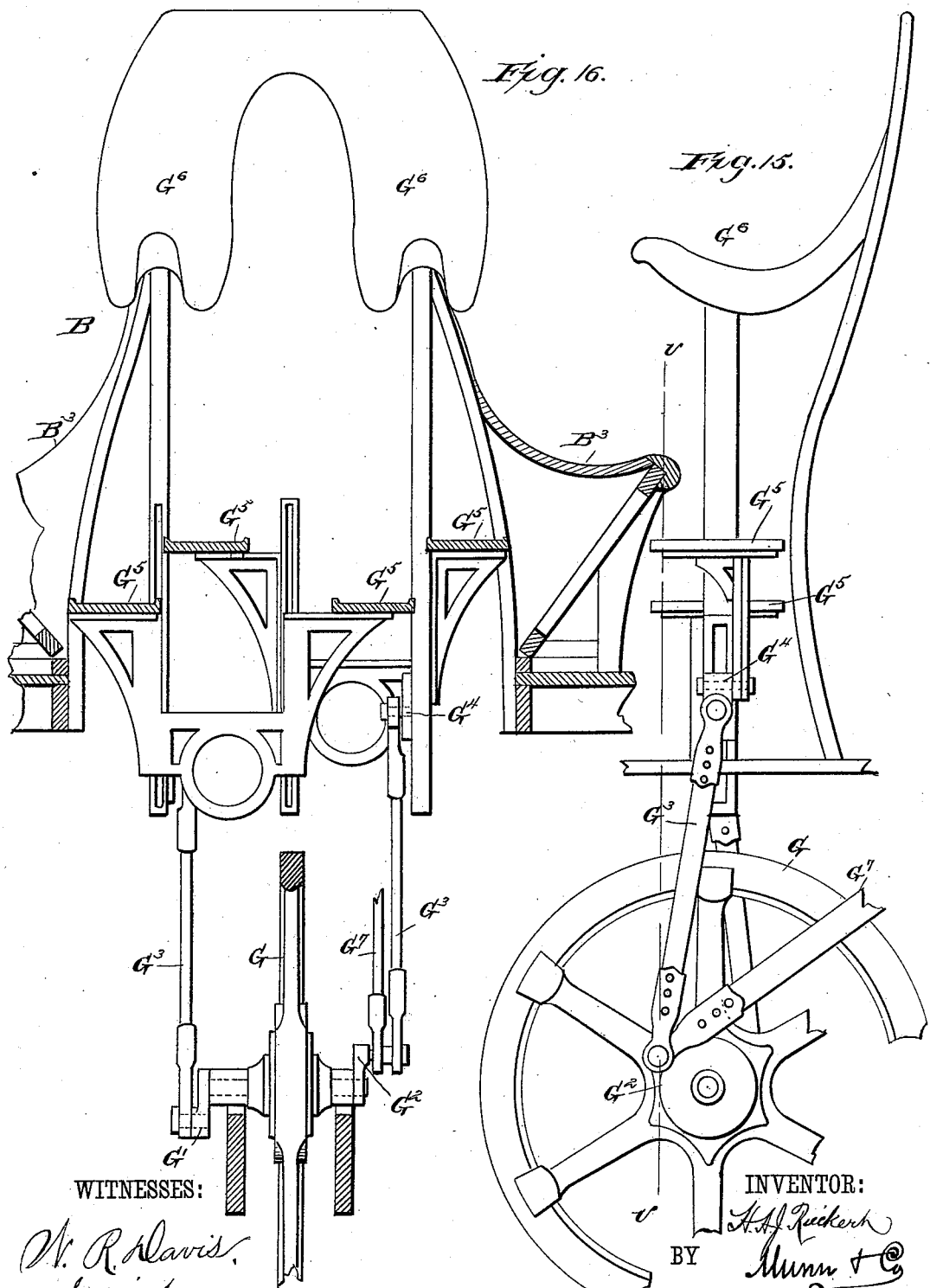

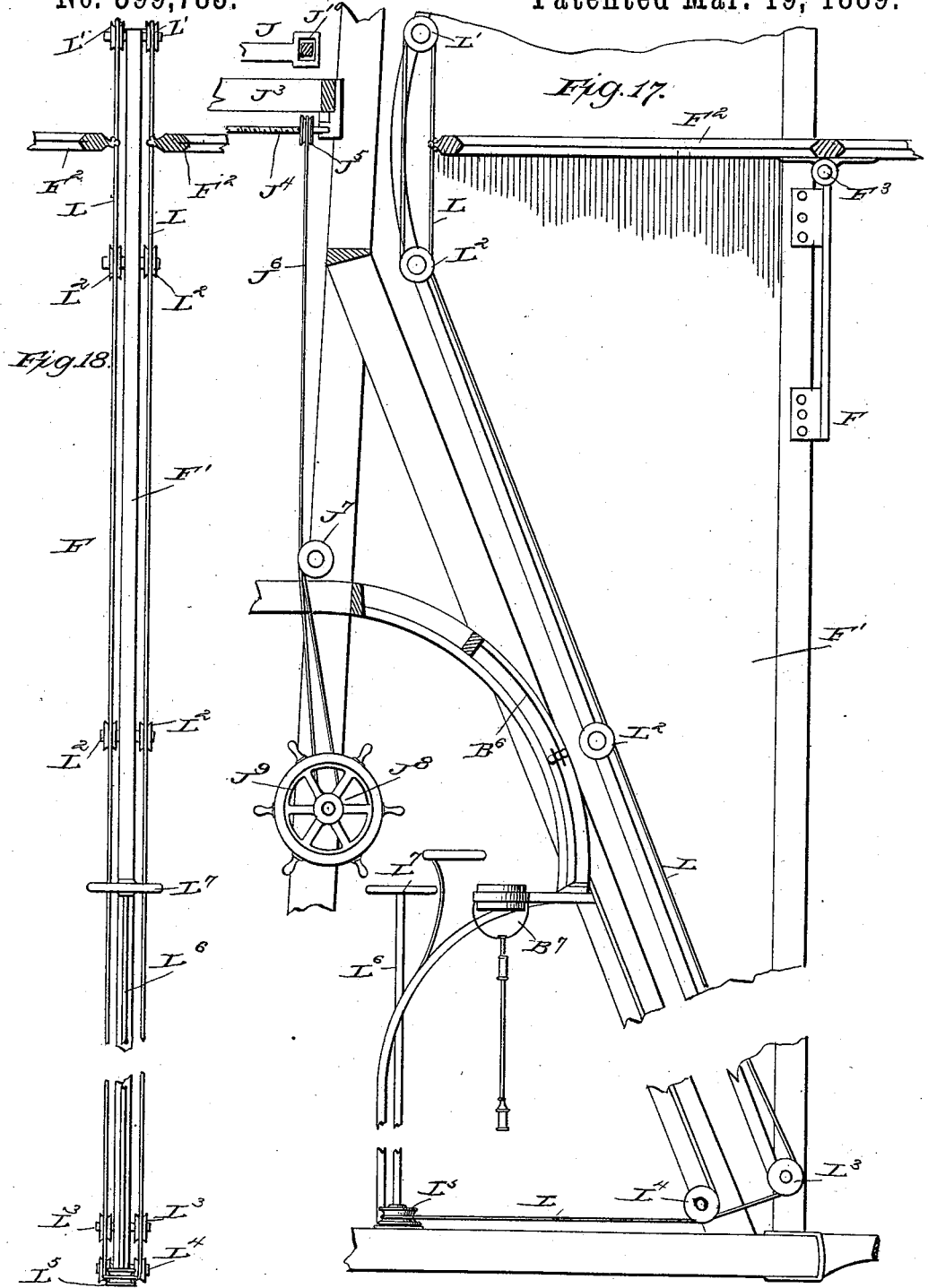

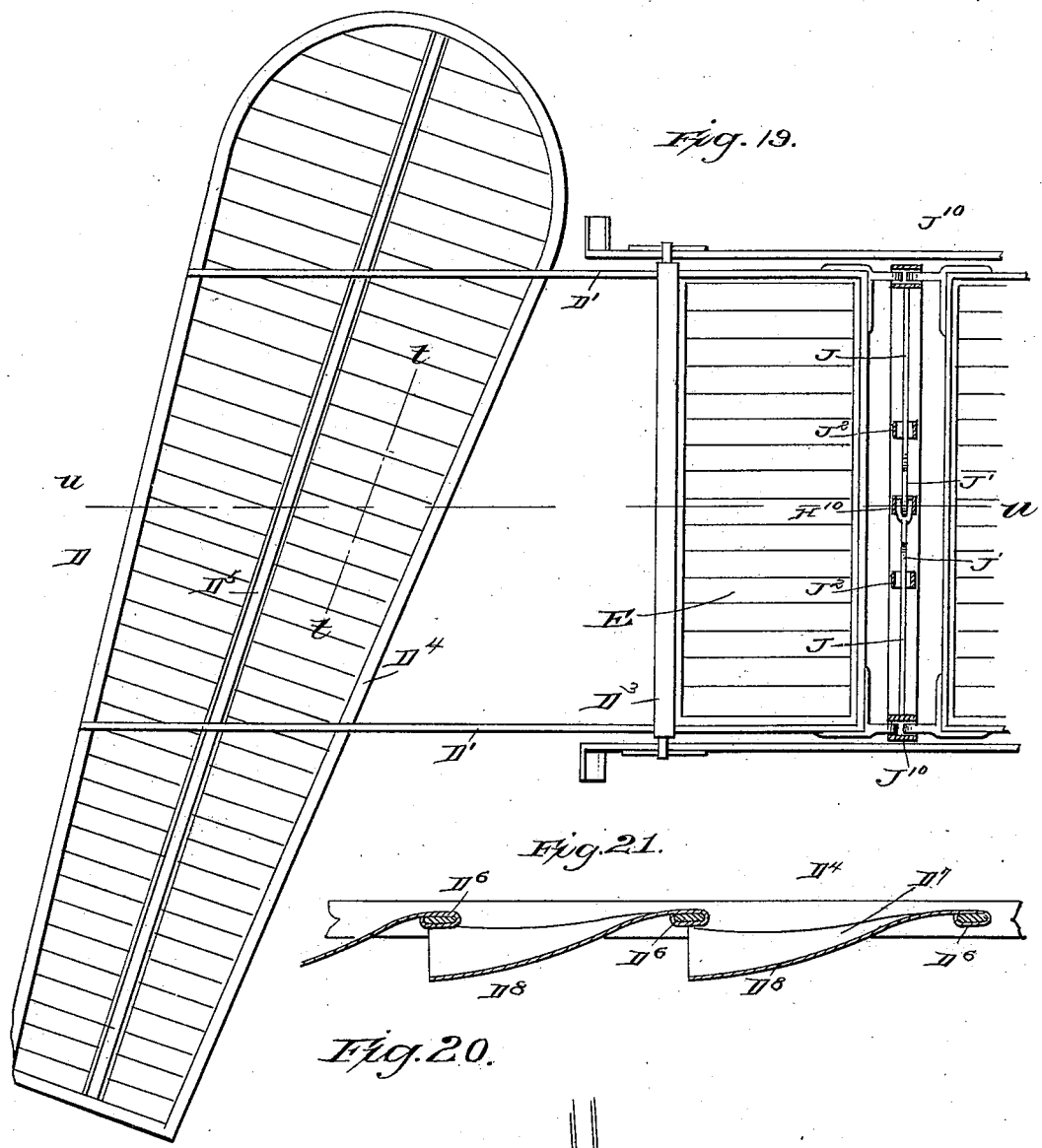

UNITED STATES PATENT OFFICE.

HERMAN A. J. RIECKERT, OF NEW YORK, N. Y.

AIR-SHIP.

SPECIFICATION forming part of Letters Patent No. 399,783, dated March 19, 1889.

Application filed April 10, 1888. Serial No. 270,205. (No model.)

*To all whom it may concern:*

Be it known that I, HERMAN A. J. RIECKERT, of the city, county, and State of New York, have invented a new and Improved Air-Ship, of which the following is a full, clear, and exact description.

The object of the invention is to provide an improved air-ship which is completely under the control of the operator and can be easily propelled and steered in any direction whatever, with, on, or against the wind.

Reference is to be had to the accompanying drawings, forming a part of this specification, in which similar letters of reference indicate corresponding parts in all the figures.

Figure 1:
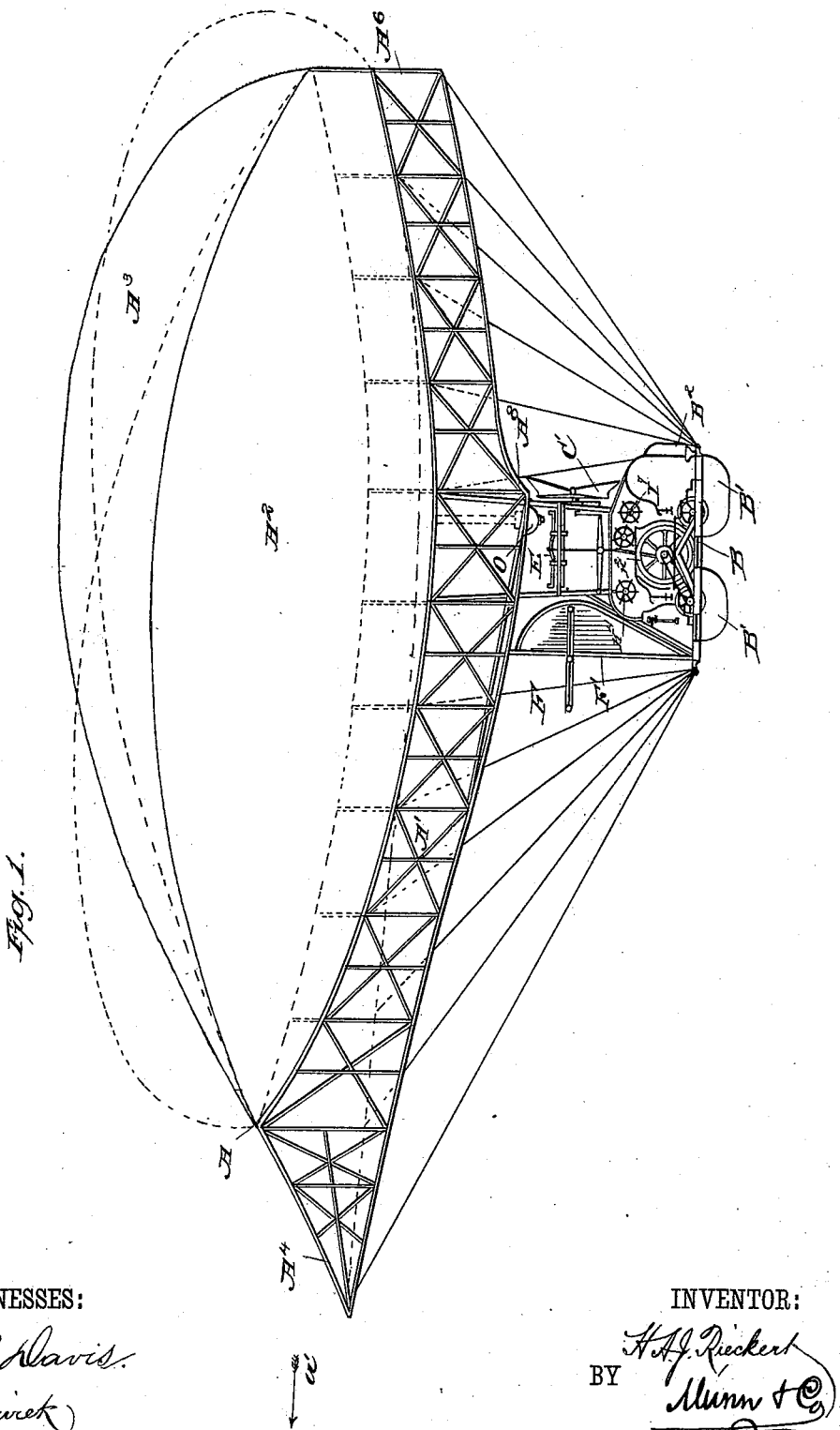
Figure 2:
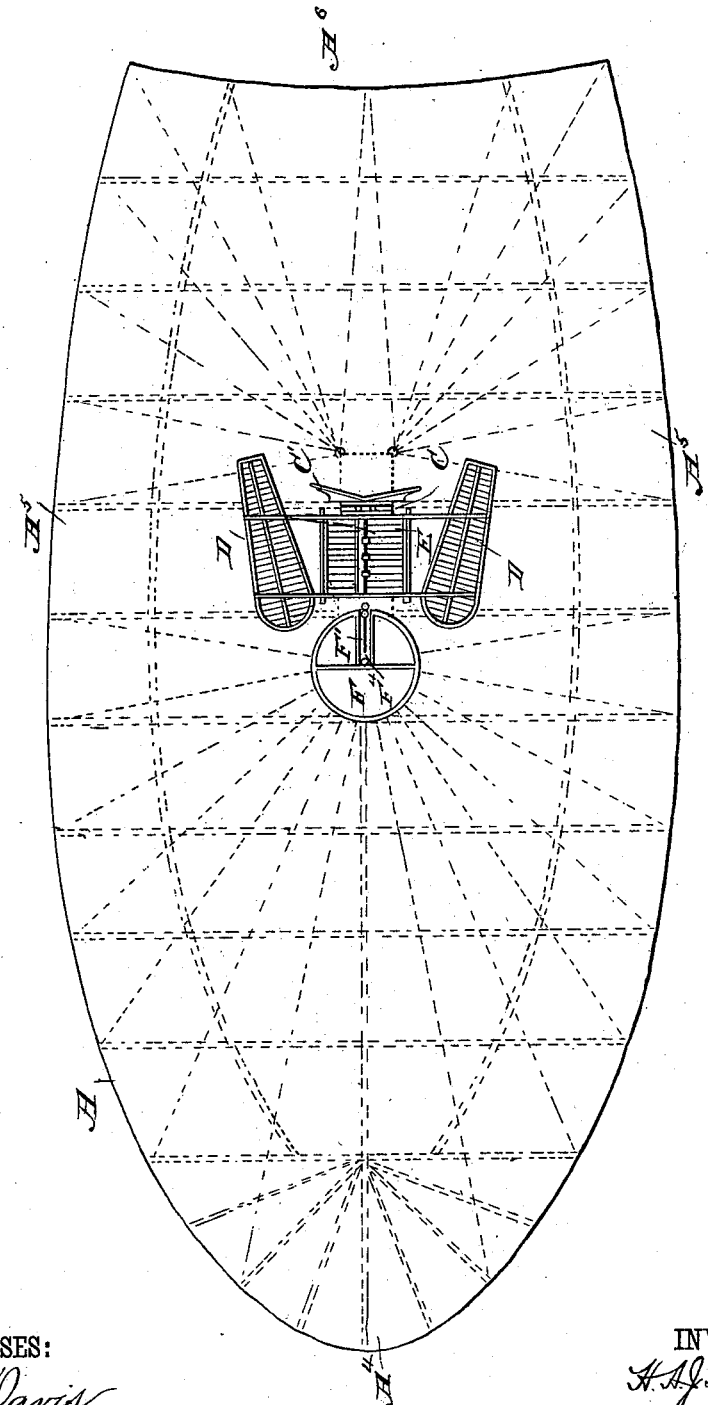
Figure 3:
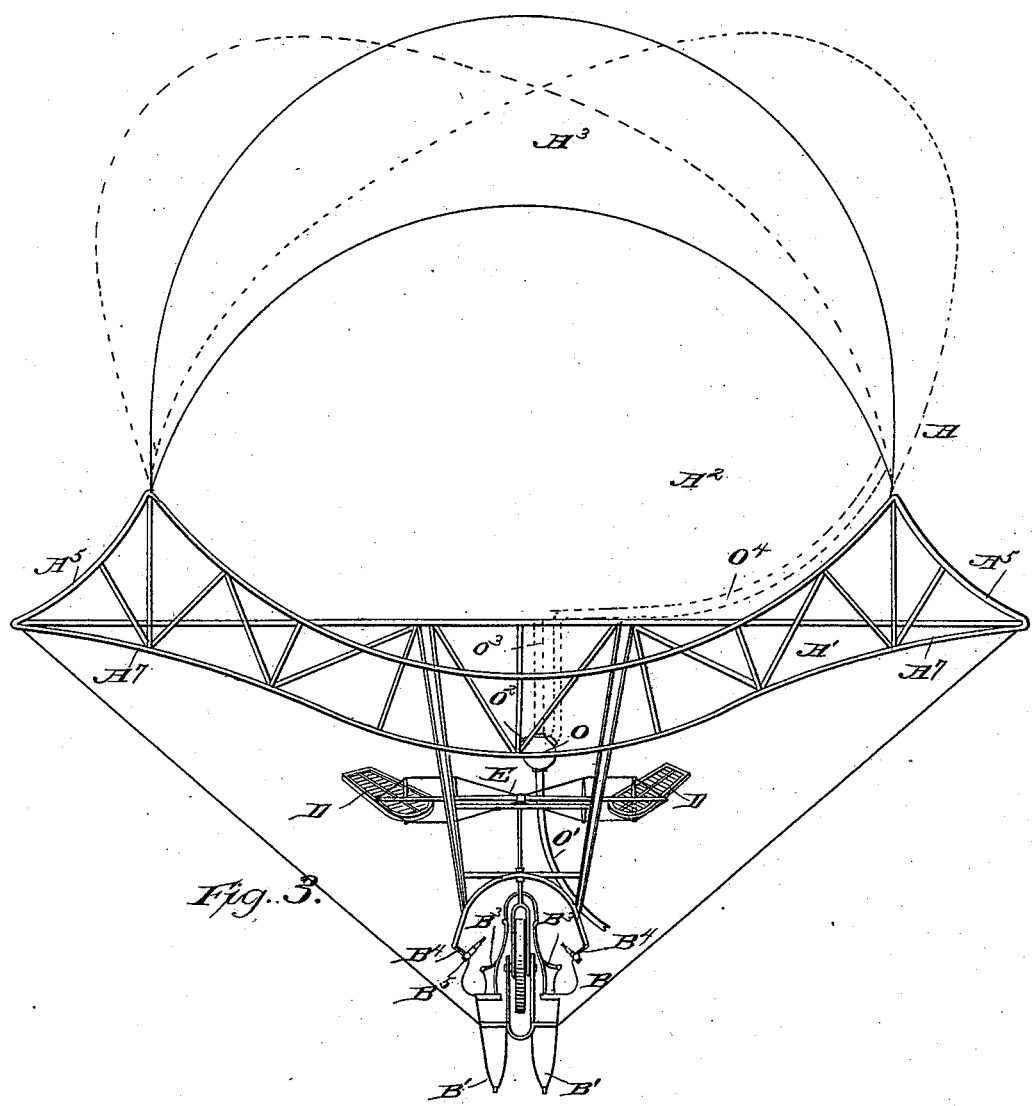
Figure 4:
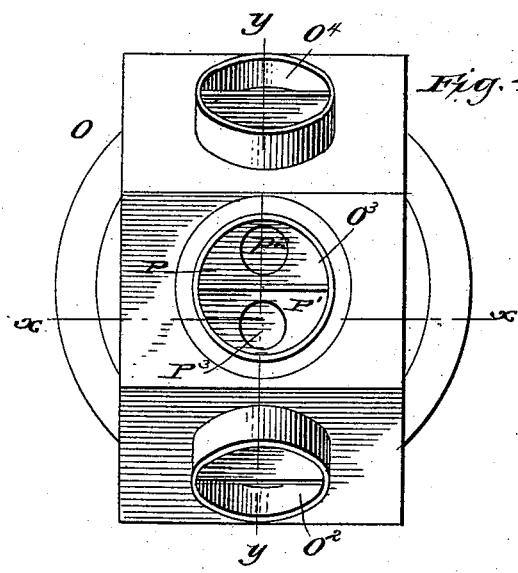
Figure 5:
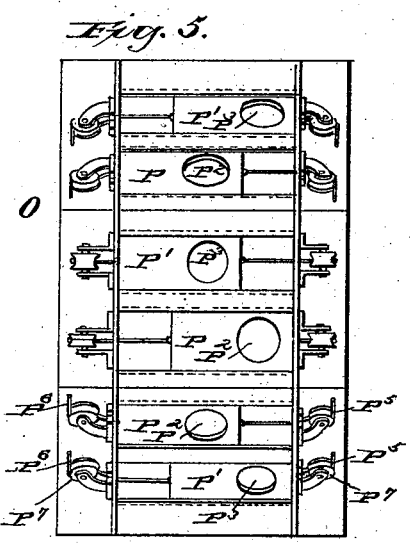
Figure 6:
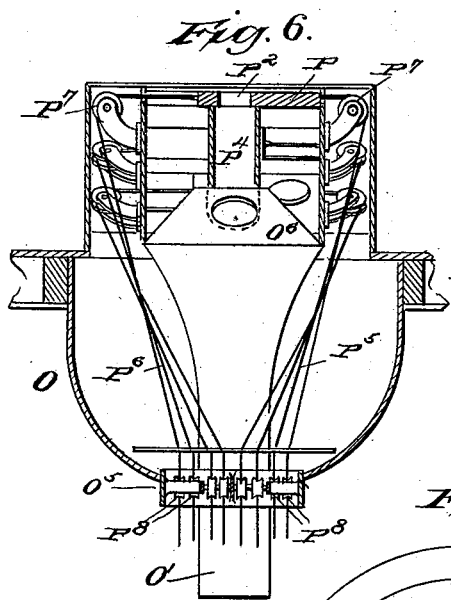
Figure 7:
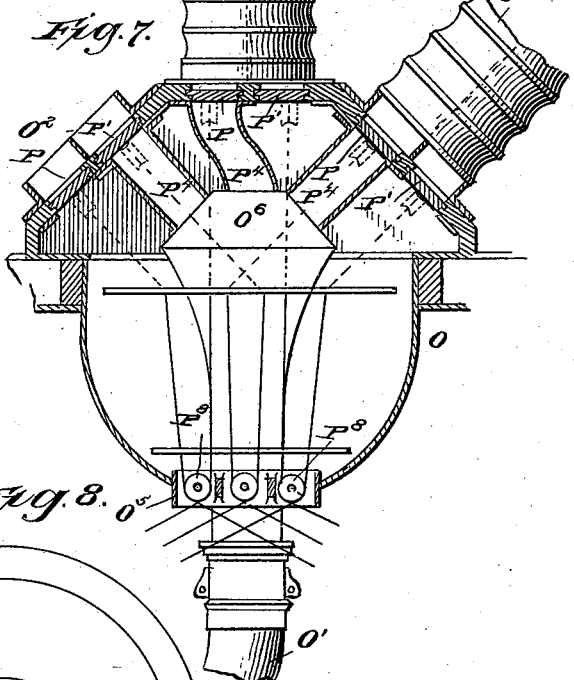
Figure 8:
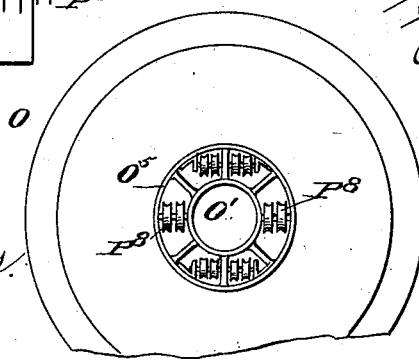

Figure 1 is a sectional side elevation of the improvement. Fig. 2 is an inverted plan view of the improvement with the basket removed. Fig. 3 is a front end elevation of the same with the basket in section. Fig. 4 is an enlarged plan view of the filling device for introducing gas into the several compartments of the balloon. Fig. 5 is a like view of the same with the top casing removed. Fig. 6 is a transverse section of the same on the line $x\,x$ of Fig. 4. Fig. 7 is a longitudinal sectional elevation of the same on the line $y\,y$ of Fig. 4. Fig. 8 is an inverted plan view of the same. Fig. 9 is an enlarged sectional side elevation of the basket, its contents, and connections. Fig. 10 is an enlarged face view of the brake mechanism for the suction-wheel. Fig. 11 is a transverse section of the basket and the propeller-wheel on the line $z\,z$ of Fig. 9. Fig 12 is a transverse sectional view of the basket and the wings on the line $w\,w$ of Fig. 9. Fig. 13 is an enlarged transverse section of part of the basket and the suction-wheel on the line $z\,z$ of Fig. 9. Fig. 14 is an enlarged side view, with parts in section, of the main driving-wheel and its connections and part of the steering device. Fig. 14$^a$ is a plan view of the ropes and pulleys for operating the vertical steering-wing. Fig. 15 is an enlarged side elevation of the motive power. Fig. 16 is a transverse section of the same on the line $v\,v$ of Fig. 15. Fig. 17 is an enlarged rear side elevation of the steering device with parts of the frame in section. Fig. 18 is an end view of the same. Fig. 19 is an enlarged plan view of the wings. Fig. 20 is a transverse sectional elevation of the same on the line $u\,u$ of Fig. 19, and Fig. 21 is an enlarged sectional side elevation of one of the wings on the line $t\,t$ of Fig. 19.

The improved air-ship consists, principally, of a balloon, A, supporting on its under side a closed basket, B, in which is located the motive power operating the suction-wheel C and the propeller-wheel C', both being located above the basket at its rear and mounted in the supports connecting the basket with the balloon. The motive power located in the basket operates side wings, D, located above and at the sides of the basket, and also operates the central wings, E, held directly above the basket and between the latter and the balloon A. In front of the basket B, and extending to within a short distance of the under side of the balloon A, is held a steering device, F, operated from within the closed basket B.

The balloon A is provided with three compartments, A', A², and A³, of which the compartment A' is the lowermost, and supports, by suitable downwardly-extending beams, the basket B, before mentioned. The compartment A' is provided with a strong wooden frame-work covered on its exterior with a fabric, preferably of silk or other suitable material, and said compartment A' is formed on its periphery like an egg, having the point A⁴, as is plainly shown in Figs. 1 and 2, and its opposite end, A⁶, is slightly curved, but almost straight, as illustrated in Fig. 2. The sides A⁵ are V-shaped in cross-section, as illustrated in Fig. 3, terminating in the point A⁴, before mentioned. The central cross-section of the compartment A' is segmental on top and similar on the bottom, with a curved upwardly-extending part, A⁷, which runs out into the V-shaped projections A⁵, as is plainly illustrated in Fig. 3.

The compartment A² of the balloon A has its bottom resting on the top segment of the compartment A', and the upper half of the said compartment A² is almost semicircular in its central cross-section and almond-shaped in its longitudinal section, as is seen in Fig. 1. The top of this compartment A² is formed of the usual fabric, preferably silk, and it forms the bottom for the compartment $A^3$, also made of silk, and having its longitudinal top line formed in the shape of a parabola, and its central cross-section almost semicircular, as shown in Fig. 3. This top compartment, $A^3$, shifts according to the direction of the wind, and assumes different positions according to the direction and strength of the wind, as illustrated in dotted lines in Figs. 1 and 3. At the normal pressure of the wind or at a normal velocity of the air-ship the top compartment, $A^3$, assumes the position shown in full lines in Fig. I. When the wind increases and the air-ship travels in the direction of the arrow $a'$, and the wind blows in the inverse direction of the arrow $a'$, the top compartment, $A^3$, shifts the top covering, so that the point of the said compartment is at the front, and when the wind blows in the opposite direction and the air-ship backs up then the top compartment assumes such a position that its point is at the rear end of the balloon A. A sidewise pressure of the wind causes the top compartment, $A^3$, to shift to the right or left, as is plainly illustrated in dotted lines in Fig. 3. The central compartment, $A^2$, is almost stationary, shifting very little.

On the under side of the lowest compartment, $A'$, is formed a transverse offset, $A^8$, directly above the propeller-wheel $C'$, before mentioned. This offset causes the air thrown out by the propeller-wheel $C'$ to exert a pressure against the front part of the lower compartment, $A'$, so that the balloon will rise more easily.

The basket B is provided on its bottom with four (more or less) boats, $B'$, which serve to sustain the entire device above water in case it descends on a lake or ocean. At the rear end of the basket B is formed a door, $B^2$, which leads to the interior, provided with two rows of longitudinal seats, $B^3$, and with horizontal windows $B^4$, in some of which are mounted on a universal joint the telescopes $B^5$, for examining the ground below. In the front of the basket B is also arranged a curved double window, $B^6$, (see Figs. 9 and 17,) and directly under this window is located a compass, $B^7$, mounted on a universal joint in the usual manner. Other suitable instruments are located in the basket B and trap-doors lead into the boats $B'$, which can be utilized for storage or for other purposes.

In the basket B, near the front and rear, are located and mounted to rotate in suitable bearings the wheels G G, each provided on its sides with crank-arms $G'$ and $G^2$, pivotally connected, by the pitmen $G^3$, with the cross-heads $G^4$, mounted to slide vertically in suitable bearings formed in the interior of the basket B. The cross-heads $G^4$ are connected with treadles $G^5$, against which press the feet of an operator seated in a seat, $G^6$, located directly above the set of treadles $G^5$. The crank-arms $G'$ and $G^2$ extend in opposite directions from each other, so that when one set of treadles $G^5$ moves up the other set of treadles $G^5$ moves down, and a continuous rotary motion is thus imparted to the wheels G. On the crank-arm $G^2$ of the wheels G is pivotally connected a pitman, $G^7$, which connects with the crank-arm $H'$, secured on a shaft, H, carrying a fly-wheel, $H^2$, and mounted to rotate in suitable bearings on a frame-work in the basket B, said shaft H being located midway between the two wheels G G, and preferably in the longitudinal center line of the basket B. The rotary motion of both wheels G G is thus transmitted to the shaft H, whereby the said fly-wheel $H^2$ is rotated.

The seats $B^3$, before mentioned, are on either side of the said wheel $H^2$, and their backs form a cover for the said shaft H and its wheel $H^2$. On the shaft H is secured an eccentric, $H^3$, (see Fig. 14,) having its eccentric-rod $H^4$ extending upward and pivotally connected with a rod, $H^5$, having a vertical bearing in the frame-work in the top of the basket B. The rod $H^5$ is connected with a lever, $H^6$, pivoted at $H^7$ on brackets secured to the frame-work of the basket B, and the other end of the said lever $H^6$ engages a cross-head, $H^8$, mounted to slide vertically in suitable bearings on the frame of the basket B.

The cross-head $H^8$ is pivotally connected, by a pitman, $H^9$, with a crank-arm, $C^2$, secured on the shaft $C^3$, carrying the suction-wheel C, before mentioned. The latter is provided with an inner hub, $C^4$, secured on the said shaft $C^3$, with a middle rim, $C^5$, and with an outer rim, $C^6$. Between the middle rim, $C^5$, and the outer rim, $C^6$, are located the blades $C^7$, set at an angle, in the usual manner, so that when the said wheel C is rotated it causes, by means of the blades $C^7$, a suction of air from the front to the rear, or from the rear to the front, according to the direction in which the said wheel is running. Between the middle rim, $C^5$, and the periphery of the hub $C^4$ is located a friction-wheel, I, secured on the inner end of a shaft, $I'$, mounted to rotate in the bearings $I^2$, (see Figs. 10 and 14,) and carrying the propeller-wheel $C'$, which is somewhat larger in diameter than the suction-wheel C, and serves to propel the air-ship forward or backward. The blades of the propeller-wheel $C'$ are made in the usual manner and of any approved construction.

The bearing $I^2$ of the shaft $I'$ is pivoted at one end, and is pivotally connected at its other end with a lever, $I^3$, extending downward and connected with the ends of the ropes $I^4$, passing over idlers $I^5$, and onto a drum secured on the shaft $I^6$, located in the interior of the basket B, and provided with a hand-wheel, $I^7$, for turning the said shaft $I^6$, so that the ropes $I^4$ are wound up or unwound, and cause the lever $I^3$ to swing, so as to cause a similar movement of the bearing $I^2$ on its fixed pivot, whereby the friction-wheel I is thrown either in contact with the middle rim, $C^5$, or with the hub C⁴ of the suction-wheel C. This movement of the friction-wheel I imparts a forward or backward movement to the wheel C', according to the contact of the said wheel C with the middle rim, C⁵, or with the hub C⁴. The lever I³ is connected with the bearing I² by a pin, I⁸, which projects into a slot of the said bearing I², so that when the lever I³ receives a swinging motion it also imparts a swinging motion to the bearing I², as above described. On the outer end of the bearing I² is pivoted a link, I⁹, extending upward and inward, and pivotally connected with a brake-shoe, I¹⁰, adapted to engage the rim of the friction-wheel I. The brake-shoe I¹⁰ is fulcrumed at its lower end on a fixed point, so that when the said lever I³ imparts a swinging movement to the bearing I² and the friction-wheel I assumes a midway position between the hub C⁴ and the rim C⁵ the link I⁹ causes an inward swinging movement of the brake-shoe I¹⁰, whereby the latter is thrown in contact with the rim of the wheel I, so as to brake the same, whereby the propeller-wheel C' ceases to rotate.

The rod H⁵ extends above the lever H⁶, and is provided on its outer end with a socket, H¹⁰, into which project from opposite directions the ends J' of the levers J, pivoted in the blocks J², mounted to slide longitudinally on a cross-beam, J³, secured to the beams supporting the basket B. In this beam J³ is also formed a bearing for the vertical rod H⁵, before mentioned. (See Fig. 14.) In the lower end of each of the blocks J² screws the rod J⁴, provided with right and left hand screw-threads screwing, respectively, into the said two blocks J², so that the latter move simultaneously toward or from each other when the screw-rod J⁴ is turned. The latter is mounted to rotate in suitable bearings and carries at one end a pulley, J⁵, over which passes a rope, J⁶, which also passes over an idler, J⁷, and then onto and around the drum J⁸, provided with a hand-wheel, J⁹, so that when the latter is turned it rotates the screw J⁴ by the action of the rope J⁶ and the pulley J⁵. According to the direction in which the wheel J⁹ is turned the blocks J² move toward or from each other, and consequently shift the pivot-points of the levers J, so that their throw is increased or diminished. The hand-wheel J⁹ is located at one side in the basket of the front seats, G⁶, thus being within convenient reach of the operator working the treadles G⁵.

On the outer end of each lever J is formed a pocket, J¹⁰, into which projects the ends D² of the beams D', supporting the outer wings, D, and the inner or central wings, E. (See Figs. 19 and 20.) The beams D' of the set of wings are fulcrumed at D³, and are of any approved construction. Preferably, however, they are made in the shape of a truss, as is plainly illustrated in Fig. 20. The wings E are rectangular in shape, and are located between the inner end, D², and the fulcrum D³, while the outer wings, D, are placed in an inclined position and provided with an outer frame, D⁴, and a central partition, D⁵. Between the latter and the sides of the frame D⁴ are secured the slats D⁶, on which are secured strips of canvas D⁷, which are also fastened by their sides to the said central partition, D⁵, and the sides of the frame D⁴, as is plainly illustrated in Figs. 19, 20, and 21. The canvas strips are bag-shaped and their outer ends extend under the next following slat D⁶, as is plainly shown in Fig. 21, so that when the wings move upward the bag parts D⁸ of the canvas strips D⁷ are opened downward, as shown in the figure above mentioned, whereby the wind from above can pass through the said canvas bags D⁸, and hence there is not offered much resistance to the wing. When the latter moves downward, the bag D⁸ extends across with its end under the next following slat D⁶, and is pressed up against the said slat, so as to close all openings in the several slats, and thereby the wings operate with their full power on the air. The wings E are also provided with slats and canvas strips in the same manner as above described in reference to the wings D. As the wings D and E are located on opposite sides of the fulcrum D³ and the beams D' receive a swinging motion, it will be seen that when one wing D moves upward the other moves downward, and vice versa.

The steering device F consists of two principal wings, F' and F², of which the wing F' is placed vertically and mounted to swing, having its front edge formed by its axis, as is plainly shown in Fig. 1, reference being also had to Figs. 2, 9, 14, 17, and 18. The other wing, F², is placed horizontally, being hinged at F³ to the axis of the wing F'. The wing F² is circular, the center being the axis of the wing F', and is provided with a slot, F⁴, through which said wing F' extends. (See Fig. 2.) The wing F' serves to steer sidewise, while the wing F² serves to steer up and down. The wing F' is connected with the ends of the rope K at its rear end, said rope passing over the pulleys K' and K² (see Fig. 14ᵃ) and down into the basket B and around a drum, K³, provided with a hand-wheel, K⁴, located on one side of the basket B next to one of the front seats, G⁶, so as to be within convenient reach of the operator on the said seat G⁶. When the operator turns the wheel K⁴, he causes the wing F' to swing on its vertical axis, so that the wing assumes an inclined position to the longitudinal central line of the air-ship, whereby the latter is steered sidewise, either to the right or left, according to the direction in which the operator turns the hand-wheel K⁴. The other wing, F², is connected by its outer ends to ropes L, each of which passes over the pulleys L' and L², located vertically one above the other, so that the ends of the wing F² move between the said two pulleys L' and L² when the rope is moved. The latter passes downward from the pulley L' over another pulley, L², on the rear end of the wing F', and then to a pulley, L³, located near the lower pivot of the said wing F', and then the rope passes under a pulley, L⁴, mounted on a frame-work of the basket, and then the rope passes to a drum, L⁵, secured on a staff, L⁶, extending vertically and provided on its upper end with the usual hand-wheel, L⁷, located within easy reach of one of the operators seated on one of the front seats, G⁶. Thus when the operator turns the hand-wheel L⁷, he causes the rope L to move so that the wing F² is turned on its hinge F⁸ and assumes an inclined position to the vertical axis of the wing F'. The front end of the wing F² is thus moved either up or down, consequently steering the ship up or down, according to the direction of the said wing and the direction in which the ship is traveling.

In order to start the fly-wheel H² easily, I provide a starting device, N, located inside of the basket B, directly above the said wheel H², as is plainly shown in Figs. 9 and 14. The starting device N is provided with a friction-wheel, N', adapted to be thrown into contact with the periphery of the fly-wheel H². The friction-wheel N' is mounted to rotate on the lower end of an arm, N², fulcrumed on a shaft, N³, mounted to rotate on a suitable bracket secured to the frame-work of the basket B. A pulley is located beside the friction-wheel N', and over it passes an endless belt, N⁴, also passing over a pulley, N⁵, secured to the shaft N³. The latter also carries a small fly-wheel, N⁶, and a crank-arm, N⁷, pivotally connected with a rod, N⁸, extending downward and provided at its lower end with a handle, so that when the operator takes hold of this handle and pulls or pushes with this rod N⁸ he imparts a rotary motion to the shaft N³, which, by its pulley N⁵ and the belt N⁴, imparts a similar motion to the friction-wheel N', which, when held in contact with the periphery of the fly-wheel H², causes the latter to revolve. An arm, N⁹, secured to the arm N², serves to press the said friction-wheel N' against the periphery of the said wheel H² with more or less force.

It will be seen that the operator can bring the shaft N³ to rotate at a high rate of speed by operating on the rod N⁸, so as to impart to the friction-wheel N' a fixed rotary motion, and then the operator by taking hold of the handle N⁹ presses the friction-wheel N' against the periphery of the wheel H². The latter is thus slowly revolved and starts the wheels G and the treadles G⁵, so that the operator operating the treadles G⁵ can work without great strain, so as to bring the main fly-wheel H² to its normal or desired rate of speed.

The air-ship is provided with a filling-receptacle, O, secured in the bottom of the lower compartment, A', of the balloon A, as is plainly shown in Figs. 1, 3, and 12. The detail construction of the filling-receptacle O is shown in Figs. 4, 5, 6, 7, and 8. In the bottom of the receptacle O is a flexible inlet pipe, O', connected in any suitable manner with the source of gas-supply from which the several compartments A', A², and A³ of the balloon are to be filled. From the upper end of the receptacle O leads a short pipe, O², which opens directly into the lower compartment, A', and a pipe, O³, extends from the receptacle O through the compartment A' into the compartment A² of the balloon, while a third pipe, O⁴, leads from the top of the receptacle O and passes through the compartments A' and A², and opens into the third compartment, A³, of the balloon A, as is plainly shown in Fig. 3.

The three compartments can be filled simultaneously or independently, if desired. The means for accomplishing this are shown in the detail, Figs. 4 to 8, and they consist, principally, of the slides P and P', located in the top of the receptacle O directly under each pipe O², O³, and O⁴. The slides P and P' are provided with apertures P² and P³, of which the aperture P³ registers with a similar aperture formed in the receptacle O, so as to connect the interior of the latter with one part of the respective pipe O², O³, or O⁴. The opening P² in the slide P is adapted to register with a pipe, P⁴, extending inward in the receptacle O and leading into the upper closed end, O⁶, of the inlet-pipe O', so that the gas from the latter passes to the closed end O⁶, and then through the pipes P⁴ into the respective pipe O², O³, or O⁴, provided that the aperture P² in the slide P registers with the respective pipe P⁴. The slides P and P' are moved forward and backward by ropes P⁵ and P⁶, so that their openings will register, said ropes P⁵ and P⁶ passing over pulleys P⁷, located in the interior of the receptacle O. Then the ropes P⁶ pass downward and over pulleys P⁸, located in the open ring O⁵, held in the bottom of the receptacle O, and through the center of which passes the central pipe, O'. The ropes then extend outward and can be manipulated by the operator in any desired manner, so as to open or close the respective slides P and P' with their respective pipes O², O³, and O⁴.

When one of the compartments is to be filled with gas, the slide P is operated by the ropes P⁵ and P⁶ until its opening P² registers with the pipe P⁴. The gas entering through the pipe O' passes through the pipe P⁴ into the respective pipe O², O³, or O⁴, and the air in the said compartment of the balloon passes down the respective pipe and through the opening P³ into the receptacle O and then out through the ring O⁵. For this purpose I prefer to provide each of the outlet-pipes O², O³, and O⁴ with a central partition extending throughout its length, so that the gas passes up on one side of the partition, while the outgoing air passes down on the other side of the partition and through the corresponding opening, P³, in the slide P', to the receptacle O.

It is understood that the incoming gases travel up one side of the respective pipe O², O³, or O⁴ and leave sufficient space for the escaping air. When the latter has escaped, then the slide P' is closed, so that only gas passes into the respective compartment of the balloon until the desired amount of gas has accumulated in the respective compartment. When the several compartments have been filled, all the slides P and P^A are closed.

The operation is as follows: When the several compartments A', A², and A³ of the balloon A are filled and the slides P and P' are closed, the operators seat themselves on the seats G⁶ and the passengers arrange themselves on the seats B³ in the basket B. The air-ship is then ready to ascend, and it moves upward by the action of the gas in the balloon A. The upward movement is assisted by the flapping side and central wings, D and E, which are set in motion by the operators on the seats G⁶ working the treadles G⁵, so as to cause the wheels G to rotate, which latter transmit their rotary motion to the main fly-wheel H², which, by the eccentric H³, the rod H⁵, and the levers J, impart an up-and-down swinging motion to the said wings D and E. The main fly-wheel H² has been previously started by one of the operators operating the starting device N, as above described. A slow forward movement is obtained at the same time by the rotation of the suction-wheel C, which is set in motion by the rod H⁵ operating the lever H⁶, which, by its pitman H⁹, connected with the crank-arm C², rotates the shaft C³, carrying the said suction-wheel C. When it is desirable to have a rapid forward movement, one of the operators turns the hand-wheel I⁷ at the rear in the basket B, so that the lever I³ imparts a swinging motion to the pivoted bearing I² until the friction-wheel I is thrown into contact with the central rim, C⁵, of the suction-wheel C. The friction-wheel I on coming in contact with the rotating rim C⁵ receives a rotary motion which is transmitted to the shaft I', carrying a large propeller-wheel, C', which on being rotated causes a rapid forward movement of the air-ship. When it is desirable to travel backward, the operator turns the hand-wheel I⁷ in the opposite direction, so that the friction-pulley I comes in contact with the hub C⁴ of the suction-wheel C, and consequently the propeller-wheel C' is rotated in an opposite direction at a lower rate of speed.

The steering to the right or left is accomplished by one of the operators on the front seat, G⁶, turning the hand-wheel K⁴ so that the vertical wing F' of the steering device F is thrown at an angle, and consequently turns the ship to the right or left, according to the direction in which the vertical wing F' has been moved. When it is desirable to start up or down, the operator turns the hand-wheel L⁷ of the staff L⁶, so that the circular wing F² of the steering device F is thrown into an inclined position, with its front end up or down, so that the air-ship travels upward or downward, according to the position of the said wing-disk F².

It will be seen that the peculiar shape of the bottom of the lowest compartment, A', of the balloon A permits of an easy riding on the air, and also facilitates an upward movement in an inclined direction, as the said lower compartment, A', is provided with a point, A⁴, and a peculiarly-curved bottom. The top compartment, A³, adjusts itself according to the direction of the wind, as above described, so that the entire balloon offers very little resistance to the wind in whatever direction the ship may be traveling. The balloon is also provided with the usual device for letting out gas in case a rapid descent is advisable. The balloon, with its gas-filling, counterbalances the weight of the basket and the several devices supported by the latter.

It will be seen that the several devices can operate in such a manner as to bring the entire air-ship under the control of the operators.

I do not limit myself to the special construction of the particular means employed for obtaining the motive power and the connections between the motive power and the several operating devices—that is, the wings and the propeller-wheels.

Having thus fully described my invention, I claim as new and desire to secure by Letters Patent—

1. In an air-ship, a balloon consisting of three compartments, of which the lowermost is stiffened by a frame-work and supports at its top the second compartment, the third compartment being formed on top of the second compartment and secured with its edges to the said frame-work, and being exposed to the action of the wind, substantially as shown and described.

2. In an air-ship, the combination, with a balloon, as described, of a closed basket supported on the under side of the said balloon, a suction-wheel mounted to rotate above the said basket at its rear, the said suction-wheel being provided with a central rim and a hub and operated from the motive power located within the said basket, a friction-wheel secured on a shaft mounted to rotate in a swinging bearing under the control of the operator in the basket, said friction-wheel being adapted to be thrown alternately into and out of contact with the said central rim and hub of the suction-wheel, and a propeller-wheel secured on the said shaft of the friction-wheel and rotating with the same, substantially as shown and described.

3. In an air-ship, the combination, with a closed basket supported on the under side of a balloon, of a steering device located in front of the said basket, and consisting of a vertical wing mounted to swing, and a disk-wing pivoted on the said vertical wing and mounted to swing, substantially as shown and described.

4. In an air-ship, the combination, with a closed basket supported on the under side of a balloon, of a steering device located in front of the said basket, and consisting of a vertical wing mounted to swing, and a disk-wing pivoted on the said vertical wing and mounted to swing, and ropes extending into the said basket for operating the said wings of the steering device, substantially as shown and described.

5. In an air-ship, the combination, with a balloon having three compartments located one above the other, of a filling-receptacle provided with an inlet-pipe and three outlet-pipes formed on the said filling-receptacle, and leading to the said three compartments of the balloon, substantially as shown and described.

6. In an air-ship, the combination, with a balloon having three compartments located one above the other, of a filling-receptacle secured in the bottom of the lowermost compartment, an inlet-pipe held on the said receptacle and adapted to be connected with the source of gas-supply, and outlet-pipes extending from the top of the said receptacle, and leading, respectively, to the said three compartments, substantially as shown and described.

7. In an air-ship, the combination, with a balloon having three compartments located one above the other, of a filling-receptacle secured in the bottom of the lowermost compartment, an inlet-pipe held on the said receptacle and adapted to be connected with the source of gas-supply, outlet-pipes extending from the top of the said receptacle, and leading, respectively, to the said three compartments, and apertured slides held in the said receptacle to control the inlet of the gas to the said outlet-pipes and the outlet of the air from the said three compartments, substantially as shown and described.

8. In an air-ship, the combination, with a closed basket, of wheels mounted to rotate in the said basket, crank-arms connected with the said wheels, treadles connected with the said crank-arms, a central fly-wheel located between the said wheels and connected with the said crank-arms, so that a rotary motion is imparted to the said main fly-wheel when the treadles are operated, an eccentric secured on the shaft of the said main fly-wheel, an eccentric-rod extending upward from the said eccentric, a lever connected with the said rod, a suction-wheel operated from the said lever, and flapping wings operated from the said rod, substantially as shown and described.

9. In an air-ship, the combination, with the main fly-wheel, of a starting device operating on the said main fly-wheel, and consisting of a friction-wheel adapted to engage the periphery of the said fly-wheel, a swinging arm in which the said friction-wheel is mounted, a crank-arm operated by a rod, and a shaft carrying the said crank-arm and provided with a pulley connected by a belt with a pulley on the said friction-wheel, substantially as shown and described.

10. In an air-ship, the combination, with the main fly-wheel, of a starting device operating on the said main fly-wheel, and consisting of a friction-wheel adapted to engage the periphery of the said fly-wheel, a swinging arm in which said friction-wheel is mounted, a crank-arm operated by a rod, a shaft carrying the said crank-arm and provided with a pulley connected by a belt with a pulley on the said friction-wheel, and a handle for pressing the said swinging arm toward or from the said fly-wheel, so as to connect the said fly-wheel with the friction-wheel or disconnect it from the same, substantially as shown and described.

11. In an air-ship, the combination, with a suction-wheel mounted to rotate and provided with a central hub and a middle rim, of a friction-wheel held between the said central hub and the middle rim, a shaft on which the said friction-wheel is secured and carrying a propeller-wheel, a pivoted bearing carrying the said shaft, and a lever pivotally connected with the free end of the said pivoted bearing, so as to throw the latter up or down to alternately engage the said friction-wheel with the said central hub and the said middle rim or disengage it from the same, substantially as shown and described.

12. In an air-ship, the combination, with a suction-wheel mounted to rotate and provided with a central hub and a middle rim, of a friction-wheel held between the said central hub and the middle rim, a shaft on which the said friction-wheel is secured and carrying a propeller-wheel, a pivoted bearing carrying the said shaft, a lever pivotally connected with the free end of the said pivoted bearing, so as to throw the latter up and down to alternately engage the said friction-wheel with the said central hub and the said middle rim or disengage it from the same, and a rope mounted on pulleys and passing over a drum operated by a hand-wheel, said rope being connected with the lower end of the said lever, substantially as shown and described.

13. In an air-ship, the combination, with a suction-wheel mounted to rotate and provided with a central hub and a middle rim, of a friction-wheel held between the said central hub and the middle rim, a shaft on which the said friction-wheel is secured and carrying a propeller-wheel, a pivoted bearing carrying the said shaft, a lever pivotally connected with the free end of the said pivoted bearing, so as to throw the latter up and down to alternately engage the said friction-wheel with the said central hub and the said middle rim and disengage it from the same, a link pivotally connected with the said bearing, and a pivoted brake-shoe pivotally connected with the said link and adapted to engage the periphery of the said friction-wheel, substantially as shown and described.

14. In an air-ship, the combination, with sets of double wings, of beams carrying the said sets of wings and mounted to swing, levers each provided on one end with a pocket, said pockets engaging the inner ends of the said beams, and a rod having an up-and-down movement and connected with the inner ends of the said levers, substantially as shown and described.

15. In an air-ship, the combination, with sets of double wings, of beams carrying the said wings and mounted to swing, levers each provided on one end with a pocket, said pockets engaging the inner ends of the said beams, a rod having an up-and-down movement and connected with the inner ends of the said levers, blocks adapted to slide longitudinally and forming pivots for the said levers, and a fixed frame carrying the said blocks and the said beams, substantially as shown and described.

16. In an air-ship, the combination, with wings, of beams carrying the said wings and mounted to swing, levers each provided on one end with a pocket, said pockets engaging the inner ends of the said beams, a rod having an up-and-down movement and connected with the inner ends of the said levers, blocks adapted to slide longitudinally and forming the pivots for the said levers, a screw-rod adapted to be turned and screwing in the said blocks, said screw-rod being provided with right and left hand threads, so that it moves the said blocks simultaneously toward or from each other, and a fixed frame carrying the said blocks, substantially as shown and described.

17. In an air-ship, the combination, with wings, of beams carrying the said wings and mounted to swing, levers each provided on one end with a pocket, said pockets engaging the inner ends of the said beams, a rod having an up-and-down movement and connected with the inner ends of the said levers, blocks adapted to slide longitudinally and forming the pivots for the said levers, a screw-rod adapted to be turned and screwing into the said blocks, said screw-rod being provided with right and left hand threads, so that it moves the said blocks simultaneously toward or from each other, a pulley secured on the said screw-rod, a rope passing over the said pulley, a drum provided with a hand-wheel on which the said rope winds, and a fixed frame carrying the said blocks, substantially as shown and described.

18. In an air-ship, a wing having an up-and-down movement and comprising a frame having a central partition, slats secured to the said frame and central partition, and a canvas strip secured by one end to one of the said slats and by its sides to the said framework and the said central partition, the other end of the said canvas strip being bagged directly under the next following slat, substantially as shown and described.

19. In an air-ship, a wing provided with transverse slats and a canvas strip secured by one end to one of the said slats and by its sides to the frame-work of the wing, the other end of the said canvas strip being bagged directly under the next following slat, so that when the wing moves upward the bag is opened, but when the wing moves downward the bag closes onto the next following slat, substantially as shown and described.

HERMAN A. J. RIECKERT.

Witnesses:
 THEO. G. HOSTER,
 C. SEDGWICK.